B. F. WALKER.
DENTAL FLOSS HOLDER.
APPLICATION FILED JULY 29, 1913.
1,106,758.
Patented Aug. 11, 1914.
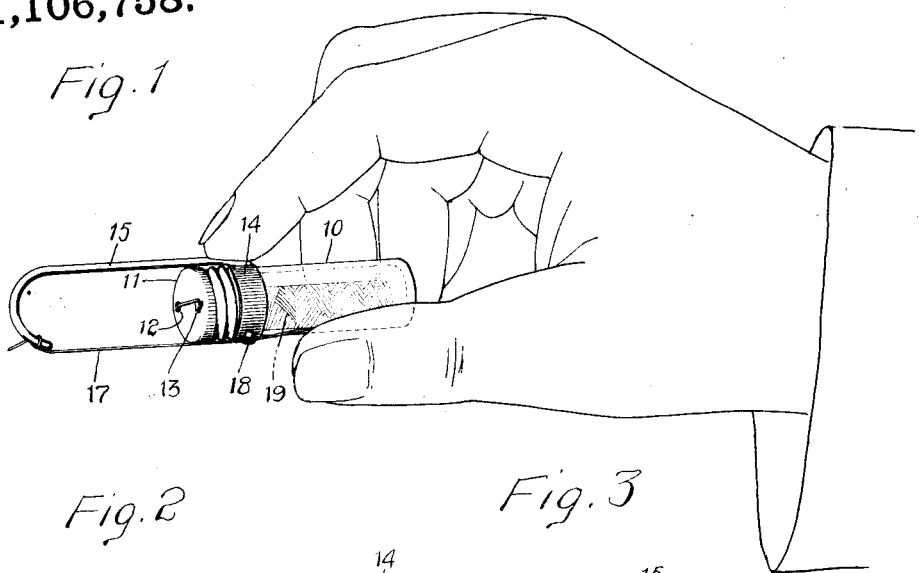
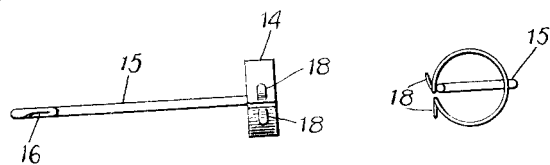
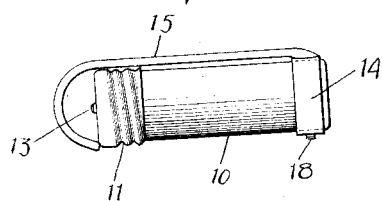
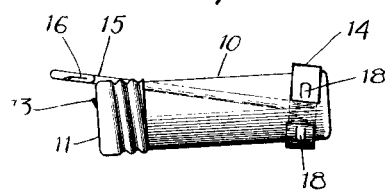
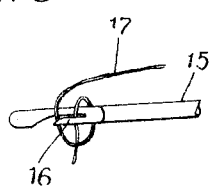
WITNESSES:
H. W. Meade
S. W. Atherton
INVENTOR
Benjamin F. Walker
BY
A. M. Wooster
ATTORNEY

UNITED STATES PATENT OFFICE.

BENJAMIN F. WALKER, OF BRIDGEPORT, CONNECTICUT.

DENTAL FLOSS-HOLDER.

1,106,758.　　　　　Specification of Letters Patent.　　Patented Aug. 11, 1914.

Application filed July 29, 1913. Serial No. 781,761.

*To all whom it may concern:*

Be it known that I, BENJAMIN F. WALKER, a citizen of the United States, residing at Bridgeport, county of Fairfield, State of Connecticut, have invented an Improvement in Dental Floss-Holders, of which the following is a specification.

This invention has for its object to provide a holder for dental floss for use in cleaning the teeth, which shall be adapted for attachment to an ordinary tubular floss container and to hold a piece of floss while in use firmly so that the holder may be passed into the mouth and the floss drawn between the teeth without inserting the fingers in the mouth, and which when not in use will slide downward on the container and be out of the way, so that the container with the holder thereon may be conveniently carried in a vest pocket or in a hand-bag. It is of course well understood that dental floss is put up for use by dentists and by the public generally in cops which are inclosed in tubular glass containers having screw caps, each cap being provided with a hole through which the floss is drawn and with a cutter under which the floss is drawn to cut off a piece for use. My novel holder is an attachment for the container which holds the piece of floss that is being used and enables it to be passed conveniently between the teeth, using the container as a handle for the holder. With these and other objects in view I have devised the novel dental floss holder which I will now describe, referring to the accompanying drawing forming a part of this specification and using reference characters to indicate the several parts.

Figure 1 is a perspective illustrating the use of my novel dental floss holder; Fig. 2 an elevation of the holder detached; Fig. 3 an end view of the holder as seen from the right in Fig. 2; Fig. 4 an elevation showing the carrying position of the holder with relation to the container; Fig. 5 a view illustrating the mode of attaching the holder to a carrier or detaching it therefrom, and Fig. 6 is a detail view on an enlarged scale illustrating the mode of attaching one end of a piece of floss to the outer end of the rod.

10 denotes a container, ordinarily made of glass, closed at one end and provided at the other end with a screw cap 11 having at one side of its top a hole 12 through which the floss is drawn and on the opposite side a cutter 13 under which the floss is drawn to cut off a piece for use, the cop end of the floss being retained by the cutter. My novel holder comprises simply a resilient metallic band 14 adapted to partially inclose and slidably engage the container, its outward movement being stopped by the screw cap, and a holding rod 15 attached to the band and extending forward parallel with the axis of the container and having its forward end extending over the top of the cap and provided with a locking slot 16 to retain one end of the piece of floss for use, which for convenience is indicated by 17. The opposite ends of the resilient band are slightly separated and are provided on opposite sides of the opening with holding lugs 18 which may be struck out from the metal of the band and about which one end of the piece of floss for use may be wound to retain it in place. The cop of floss within the container is indicated by 19 in Fig. 1. The special shape to which the outer end of the rod is formed is not an essential feature of the invention. In order to insure ample strength and avoid the possibility of bending the outer end of the rod I preferably curve it over in the form of a hook so that the end will extend backward toward the band, as clearly shown in the drawing.

The operation is as follows: The holder is attached to a container by springing the band slightly and inserting the base of the container therein, as in Fig. 5. When the floss in the container is exhausted the holder may be removed and attached to a new container. The carrying position of the container and holder is clearly shown in Fig. 4. When it is desired to use the holder the operator slides the container forward on the holder, as in Fig. 1, until the band is in engagement with the screw cap, then detaches the end of floss from the cutter, draws out a sufficient quantity for use and then draws the floss under the cutter to cut off a piece for use, leaving the cop end of the floss fast under the cutter. One end of the piece of floss for use is then attached to the outer end of the rod, as illustrated in Fig. 6. The end of floss is drawn into the slot, then the floss is looped around the end of the rod and drawn into the slot a second time, which locks it securely in place. The other end of the piece for use is locked in place by passing it under one of the lugs on the band, then across and under the other lug. The floss may be drawn under the lugs a second time if preferred, but after drawing once under each lug the end may be turned down parallel with the container and held by the thumb of the operator, as in Fig. 1. To clean the teeth the forward end of the rod is passed into the mouth and the piece of floss indicated by 17 is drawn backward and forward between the teeth by moving the container with the holder thereon backward and forward longitudinally, the container serving as a handle for the holder while in use as clearly shown in Fig. 1.

Having thus described my invention I claim:

1. A holder for dental floss in use adapted for attachment to a floss container, comprising a resilient band adapted to partially inclose and slide on a container and a curved rod extending forward from the band and provided at its outer end with a locking slot for retaining an end of floss, said band being adapted to slide backward on the container when the holder is not in use.

2. The combination with a tubular floss container, of a holder for floss in use comprising a relatively narrow band slidable on the container, and a rod of substantially the same length as the container, extending forward from the band and having an end extending over the top of the container, the container serving as a handle when the floss is in use, and the holder being pushed backward on the container when not in use.

In testimony whereof I affix my signature in presence of two witnesses.

BENJAMIN F. WALKER.

Witnesses:
A. M. WOOSTER,
S. W. ATHERTON.